US 7,590,514 B1

(12) United States Patent  (10) Patent No.: US 7,590,514 B1
Olovsson  (45) Date of Patent: Sep. 15, 2009

(54) METHOD AND SYSTEM FOR SIMULATING INFLATION OF AN ENCLOSED VOLUME WITH FLEXIBLE BOUNDARY USING GAS PARTICLES

(75) Inventor: Lars Olovsson, Huddinge (SE)

(73) Assignee: Livermore Software Technology Corporation, Livermore, CA (US)

( * ) Notice: Subject to any disclaimer, the term of this patent is extended or adjusted under 35 U.S.C. 154(b) by 479 days.

(21) Appl. No.: 11/420,029

(22) Filed: May 24, 2006

(51) Int. Cl.
G06G 7/48 (2006.01)
(52) U.S. Cl. .......................................... 703/6
(58) Field of Classification Search ............... 703/9, 703/22, 6
See application file for complete search history.

(56) References Cited

OTHER PUBLICATIONS

Bouvier, Cohen, and Najman, "From crowd simulation to airbag deployment: particle systems, a new paradigm of simulation". Journal of Electronic Imaging, vol. 6(1), pp. 94-107, Jan. 1997.*
Garcia, "Stochastic Particle Algorithms: From DSMC to CUBA", 7th International Conference on the Discrete Simulation of Fluids, Oxford, Jul. 17, 1998.*
Marklund and Nilsson, "Simulation of airbag inflation processes using a coupled fluid structure approach". Journal of Computational Mechanics, vol. 29, pp. 289-297, 2002.*
Bruno, Capitelli, and Longo, "DSMC modelling of vibrational and chemical kinetics for a reacting gas mixture". Chemical Physics Letters vol. 289, pp. 141-149, 1998.*
Feng and Michaelides, "The immersed boundary-lattice Boltzmann method for solving fluid-particles interaction problems", Journal of Computational Physics vol. 195, pp. 602-628, 2004.*
Allen R. York II et al., "The material point method for simulation of thin membranes", 1999, International Journal for Numerical Methods in Engineering, vol. 44, pp. 1429-1456.*

Wolfgang Sinz et al., "The development of a 3D-Navier-Stokes code for the simulation of an airbag inflation", 2008, Simulation Modeling Practice and Theory, vol. 16, pp. 885-899.*
Per-Olof Marklund et al., "Simulation of airbag deployment using a coupled fluid-structure approach", 2002, 7th International LS-DYNA Users Conference, pp. 10-1 through 10-8.*
Isabelle Valentin Bianco et al., abstract of "Particle method for airbag deployment simulation", 1996, retrieved from www.sae.org, two unnumbered pages.*
Gyoko Nagayama et al., "A general expression for the condensation coefficient based on transition state theory and molecular dynamics simulation", 2003, Journal of Chemical Physics, vol. 118, No. 3, pp. 1392-1399.*

\* cited by examiner

*Primary Examiner*—Paul L Rodriguez
*Assistant Examiner*—Russ Guill
(74) *Attorney, Agent, or Firm*—Roger H. Chu

(57) ABSTRACT

A system, method and software product for simulating inflation of an enclosed volume using gas particles is described. A gas flow characteristics is defined. A group of gas particles is created in the enclosed volume to simulate the injected gas. The average velocity of the gas particles is determined by the temperature and the molar mass of the gas represented by the particles. The gas particles travel through the nozzle into the enclosed volume in random directions. All gas particles are checked for collisions with the boundary and with one another. After detection of a collision, the energy of the particle is transferred either to the boundary or anther particle. The kinetic energy of a gas particle includes a translation and a spinning-plus-vibration component. Only the translation component is transferred to the boundary, while both components are readjusted after a collision between two particles. In addition, the initial balance ratio is restored after a particle-to-particle collision.

21 Claims, 9 Drawing Sheets t = 0ms t = 5ms t = 30ms

METHOD AND SYSTEM FOR SIMULATING INFLATION OF AN ENCLOSED VOLUME WITH FLEXIBLE BOUNDARY USING GAS PARTICLES

BACKGROUND

1. Field of the Invention

The present invention generally relates to a method, system and software product used in the area of computer-aided engineering analysis, more particularly to simulating inflation of an enclosed volume with flexible boundary using gas particles.

2. Description of the Related Art

Continuum mechanics has been used for simulating continuous matter such as solids and fluids (i.e., liquids and gases). Differential equations are employed in solving problems in continuum mechanics. Many numerical procedures have been used. One of the most popular methods is finite element analysis (FEA), which is a computerized method widely used in industry to model and solve engineering problems relating to complex systems such as three-dimensional non-linear structural design and analysis. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

One of the most challenging FEA tasks is to simulate an impact event such as car crash or metal forming. As the modern computer improves, engineers not only wish to simulate the vehicle behavior in a car crash, they also want to simulate the occupant safety device such as airbag. However, inflating an airbag during a car crash is not suitable by solving a continuum mechanics problem. Today, one of the methods used for simulating airbag deployment is to apply a layer of artificially created pressure on the shell elements that represent the airbag numerically. As a result, the simulation of airbag is not very realistic in the current approach based on continuum mechanics.

It is therefore desirable to have new improved method and system for simulating inflation of an enclosed volume with flexible boundary (e.g., an airbag in a vehicle).

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses a system, method and software product for simulating inflation of an enclosed volume with flexible boundary using gas particles. According to one aspect, the flexible boundary of the enclosed volume is discretized in a finite element analysis model (e.g., represented by a number of shell elements with lumped mass at the corner nodes). A gas flow characteristics (i.e., gas mass flow rate versus time, initial temperature) is defined. The location of nozzle and the size of particles are also defined. A simulation of inflation of the enclosed volume is conducted in a time domain represented by a large number of solution cycles. At each solution cycle, the number of new gas particles is determined and created in the enclosed volume to simulate the injected gas. The average velocity of the new gas particles is determined by the temperature and the mass of the particles. The new gas particles travel through the nozzle into the enclosed volume in random directions. All of the particles including the newly added and the existed are checked for collisions with the flexible boundary of the enclosed volume and with one another. After detection of a collision, the energy of the particles is transferred either to the boundary or anther particle based on principles of mass, momentum and energy conservation. The simulation continues until the predetermined total simulation time has been reached.

According to another aspect, the gas particle is an approximation of a group of gas molecules lumped together. The kinetic energy of a gas particle includes a translation component and a spinning-plus-vibration component. An initial balance ratio of the spinning-plus-vibration component and translation component is fixed for a particular type of gas. For example, this ratio is $2/3$ for air. Only the translation component of the kinetic energy is transferred to the flexible boundary in a collision with the boundary, while both components are readjusted after a collision between two particles. In addition, the initial balance ratio is restored after a particle-to-particle collision.

According to one embodiment, the present invention is a method for simulating inflation of an enclosed volume with flexible boundary using gas particles, the method includes at least the following: (a) receiving gas flow characteristics used for the inflation of the enclosed volume; (b) creating a number of new gas particles based on the gas flow characteristics in the enclosed volume in random directions, wherein each of the new gas particles possess a kinetic energy and wherein the kinetic energy has a translation component and a spinning-plus-vibration component; (c) tracking all of the gas particles for collisions; (d) calculating kinetic energy transfer between two colliding objects; (e) updating current simulation time; and when the current simulation time is less than a predefined total simulation time repeating (b) to (e).

One of objects, features, and advantages of the present invention is a more realistic simulation of inflation of an enclosed volume using gas particle dynamics instead of an artificially created pressure distribution.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-6B. However, those skilled in the art will readily appreciate that the detailed description given herein with respect to these figures is for explanatory purposes as the invention extends beyond these limited embodiments.

Figure 1A:
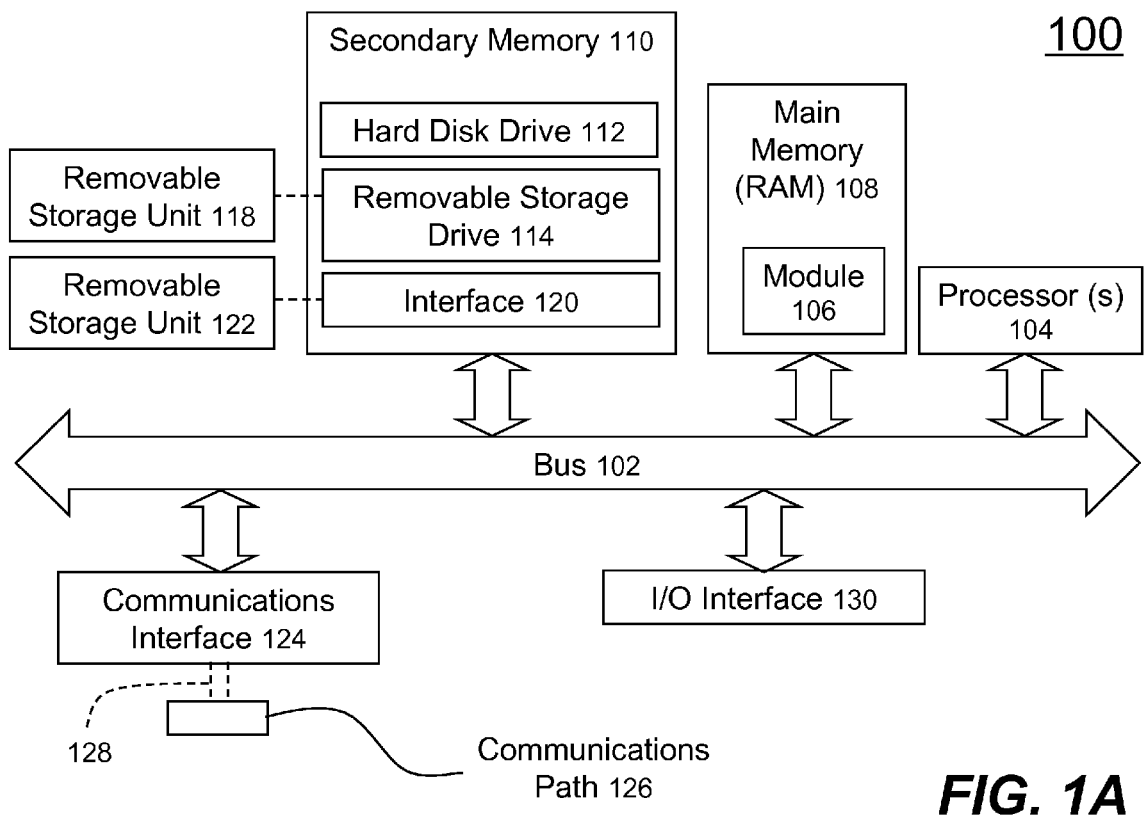
FIG. 1A depicts a block diagram of an exemplary computer, in which one embodiment of the present invention may be implemented.

Referring now to the drawings, in which like numerals refer to like parts throughout several views. The present invention may be implemented using hardware, software or a combination thereof and may be implemented in a computer system or other processing system. In fact, in one embodiment, the invention is directed towards one or more computer systems capable of carrying out the functionality described herein. An example of a computer system 100 is shown in FIG. 1A. The computer system 100 includes one or more processors, such as processor 122. The processor 122 is connected to a computer system internal communication bus 120. Various software embodiments are described in terms of this exemplary computer system. After reading this description, it will become apparent to a person skilled in the relevant art(s) how to implement the invention using other computer systems and/or computer architectures.

Computer system 100 also includes a main memory 108, preferably random access memory (RAM), and may also include a secondary memory 110. The secondary memory 110 may include, for example, one or more hard disk drives 112 and/or one or more removable storage drives 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means may include, for example, a removable storage unit 122 and an interface 120. Examples of such may include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 122 to computer system 100. In general, Computer system 100 is controlled and coordinated by operating system (OS) software, which performs tasks such as process scheduling, memory management, networking and I/O services. Exemplary OS includes Linux®, Microsoft Windows®.

There may also be a communications interface 124 connecting to the bus 102. Communications interface 124 allows software and data to be transferred between computer system 100 and external devices. Examples of communications interface 124 may include a modem, a network interface (such as an Ethernet card), a communications port, a PCMCIA slot and card, etc. Software and data transferred via communications interface 124 are in the form of signals 128 which may be electronic, electromagnetic, optical, or other signals capable of being received by communications interface 124. These signals 128 are provided to communications interface 124 via a communications path (i.e., channel) 126. This channel 126 carries signals (or data flows) 128 and may be implemented using wire or cable, fiber optics, a phone line, a cellular phone link, an RF link and other communications channels.

The channel 126 facilitates a data flow 128 between a data network and the computer 100 and typically executes a special set of rules (i.e., a protocol) to send data back and forth. One of the common protocols is TCP/IP (Transmission Control Protocol/Internet Protocol) commonly used in the Internet. In general, the communication interface 124 manages the assembling of a data file into smaller packets that are transmitted over the data network or reassembles received packets into the original data file. In addition, the communication interface 124 handles the address part of each packet so that it gets to the right destination or intercepts packets destined for the computer 100.

In this document, the terms "computer program medium" and "computer usable medium" are used to generally refer to media such as removable storage drive 114, a hard disk installed in hard disk drive 112, and signals 128. These computer program products are means for providing software to computer system 100. The invention is directed to such computer program products.

The computer system 100 may also include an I/O interface 130, which provides the computer system 100 to access monitor, keyboard, mouse, printer, scanner, plotter, and alike.

Computer programs (also called computer control logic) are stored as application modules 106 in main memory 108 and/or secondary memory 110. Computer programs may also be received via communications interface 124. Such computer programs, when executed, enable the computer system 100 to perform the features of the present invention as discussed herein. In particular, the computer programs, when executed, enable the processor 104 to perform features of the present invention. Accordingly, such computer programs represent controllers of the computer system 100.

In an embodiment where the invention is implemented using software, the software may be stored in a computer program product and loaded into computer system 100 using removable storage drive 114, hard drive 112, or communications interface 124. The application module 106, when executed by the processor 104, causes the processor 104 to perform the functions of the invention as described herein.

The main memory 108 may be loaded with one or more application modules 106 that can be executed by one or more processors 104 with or without a user input through the I/O interface 130 to achieve desired tasks. In operation, when at least one processor 104 executes one of the application modules 106, the results are computed and stored in the secondary memory 110 (i.e., hard disk drive 112). The status of the simulation (e.g., progress of the inflation of the enclosed volume) is reported to the user via the I/O interface 130 either as a list or a graph.

In one embodiment, an application module 106 is configured to facilitate the creation of the flow characteristics. The module 106 allows the user to define a gas mass flow rate versus time curve, a flexible boundary definition, etc. In another embodiment, an application module 106 is configured to facilitate the detection of particle-to-particle and particle-to-boundary collisions. In yet another embodiment, an application module 106 is configured to facilitate the energy transfer during a collision.

Figure 1B:
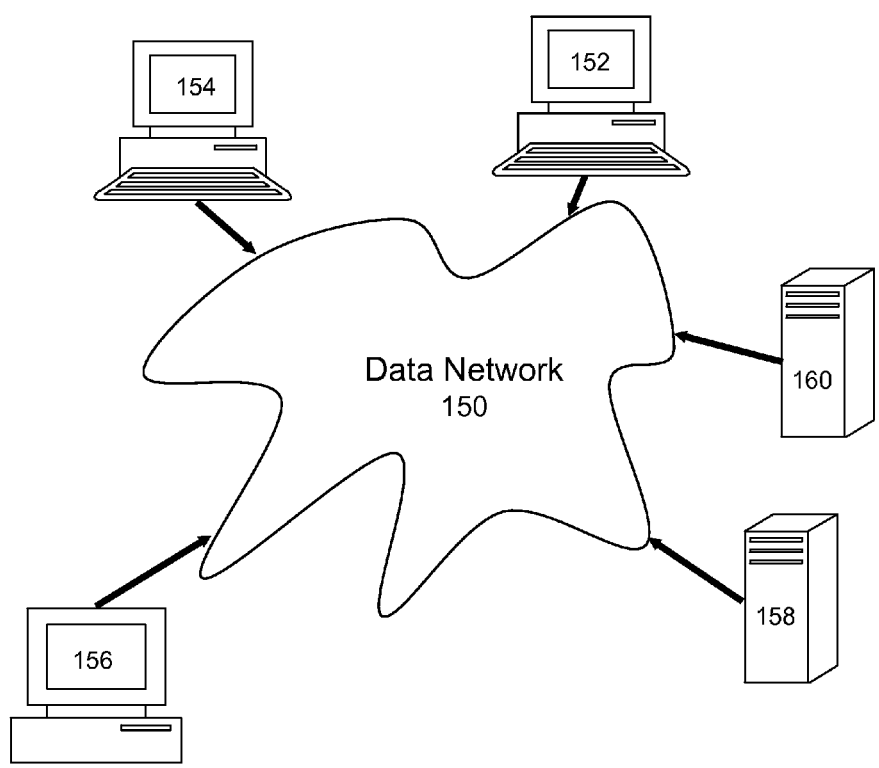
FIG. 1B depicts an exemplary network environment that one embodiment of the present invention may be deployed.

FIG. 1B depicts a networked computing environment 140, in which one embodiment of the present invention may be practiced. A plurality of network capable computing devices 152,154,156,158 and 160 (e.g., the computer device 100 described in FIG. 1A) are coupled to a data network 150. These computing devices 152-160 can communicate with each other via the network 150. The data network 150 may include, but is not limited to, the Internet, an Intranet, local area network (LAN), wide area network (WAN), a wireless network or a data network comprises of public and private networks. In one embodiment, a software module (e.g., 106 in FIG. 1A) for a finite element analysis may be configured and executed on a computing device 156, while the pre- and post-processing of the simulation are conducted on another computing device 160 by users. The input file and the output results file are transmitted over the data network 150 between the computing device 160 and the computing device 156. During the execution of the application module, the user may be able to monitor the progress of the analysis at another computing device 156.

Figure 2:
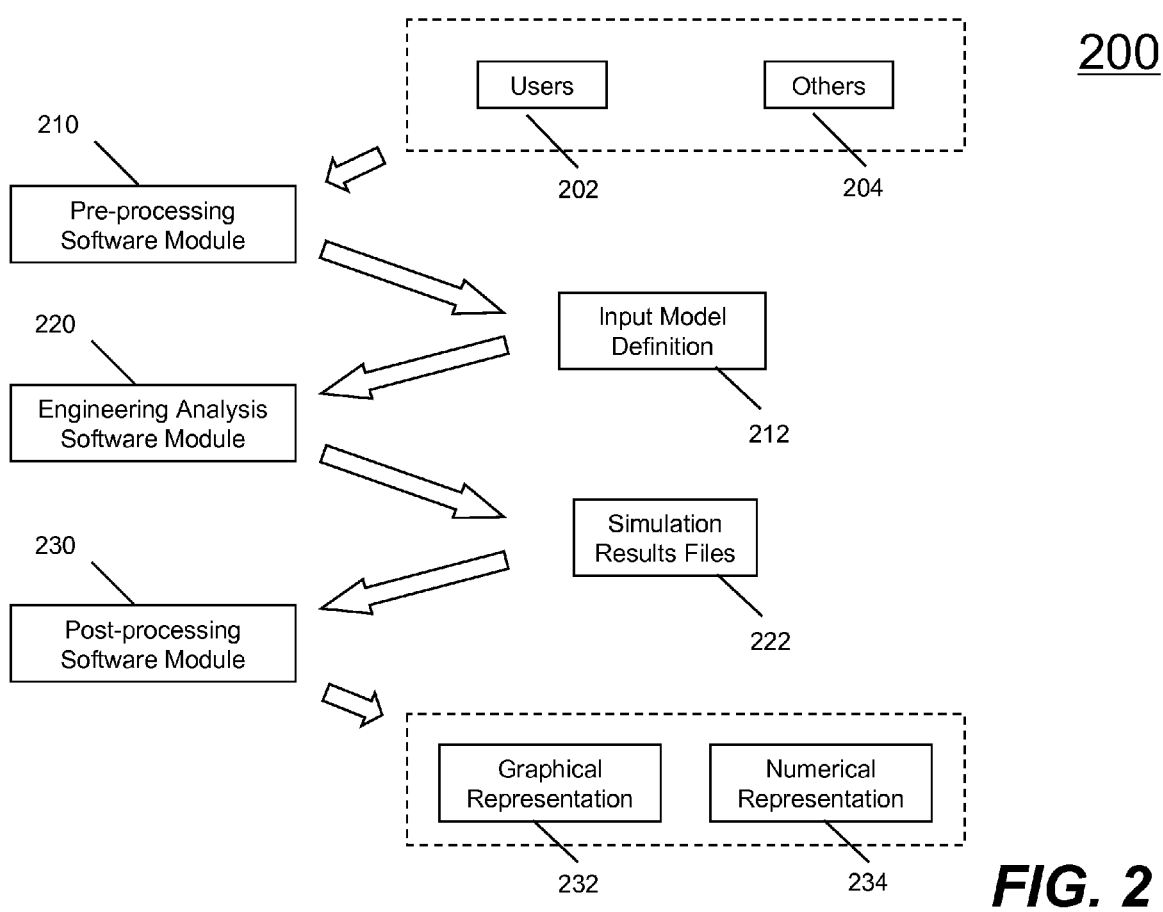
FIG. 2 shows a functional diagram of exemplary software modules in accordance with one embodiment of the present invention.

FIG. 2 a functional diagram 200 of exemplary software modules in accordance with one embodiment of the present invention. In general, an engineering analysis simulation employs a pre-processing software module 210 runs on a computing device (e.g., 100 of FIG. 1A). The pre-processing module 210 receives inputs from users 202 and other software packages 204 (e.g., a computer-aided-design software, an input conversion software, etc.). The pre-processing module 210 generally allows interactive activities for users 202, such that the input model definition 212 can be created efficiently with visual inspection. The input model definition 212 is the result or output of the pre-processing software module 210 to be used by the engineering analysis module 220 as input. In one embodiment, the analysis module 220 is configured to facilitate the simulation the collision of gas particles. The output of the analysis module 220 is the simulation results file or files 222, which contains numerical data in general. The post-processing software module 230 is then used to receive the numerical results from the simulation results files 222 and to display the numerical results in graphical 232 or numerical representation 234 as appropriated. The post-processing module 230 enables users to review the simulation results visually. One exemplary implementation of this technique is included in a suite of engineering analysis computer software products, LS-PREPOST® and LS-DYNA®, offered by Livermore Software Technology Corporation, Livermore, Calif., USA.

Figure 3A:
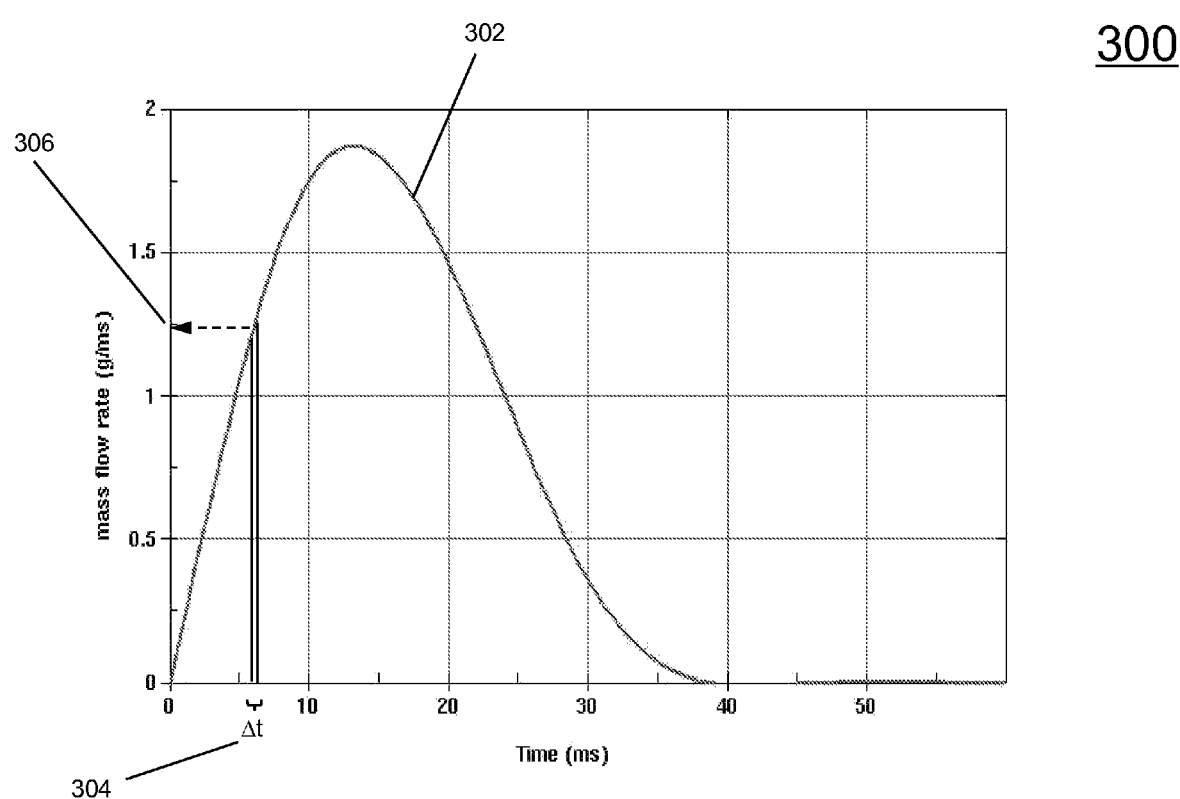
FIG. 3A shows an exemplary graphical chart of mass flow rate versus time used as input in accordance with one embodiment of the present invention.

FIG. 3A shows an exemplary graphical chart 300 of mass flow rate versus time used as input in accordance with one embodiment of the present invention. The horizontal axis of the plot 300 represents the time in millisecond (ms) and the vertical axis represents mass flow rate of the gas to be used to inflate the enclosed volume in grams/ms. The curve 302 represents the mass flow rate over time hence the area under the curve 302 represents the total mass of the gas to be used to inflate the enclosed volume (e.g., an airbag of a vehicle). The mass of the gases varies with different type of gases.

In one embodiment, the simulation of particle dynamics is based on a pre-determined number of gas particles by users. The mass m of each of the particles is then obtained by dividing the total mass obtained from the chart 300 by the pre-determined number of particles. The initial average velocity $\overline{V}$ of each particle is a function of temperature T as follows:

$$\overline{V} = \sqrt{\frac{3RT}{M}}$$ where $R$ is a constant and $M$ is the molar mass.

In a time domain simulation, a set of new gas particles are created to simulate the gas inflating the enclosed volume at each solution cycle. At a particular solution cycle, the mass of new gas particles to be created is obtained by multiplying the mass flow rate 306 of the solution time at that particular solution cycle with the time step size $\Delta t$ 304 hence the number of the new gas particles can be determined. Each of the new gas particles is then created to simulate the inflation of the enclosed volume (e.g., an airbag in a vehicle) through at least one pre-defined nozzle location in random directions.

Figure 3B:
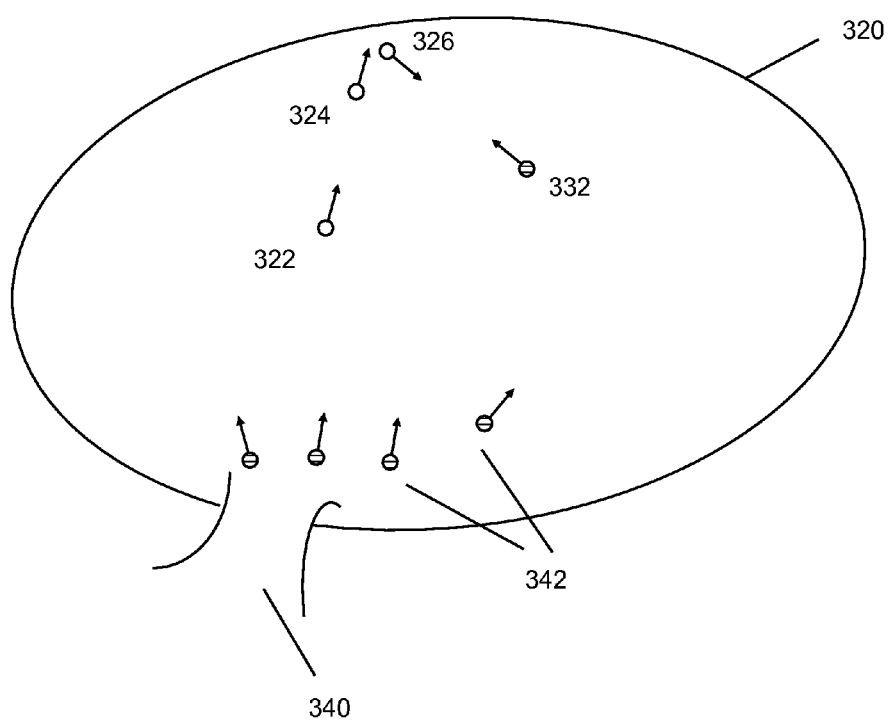
FIG. 3B shows an exemplary particle colliding with a flexible boundary and with another exemplary particle in accordance with one embodiment of the present invention.
Figure 4A:
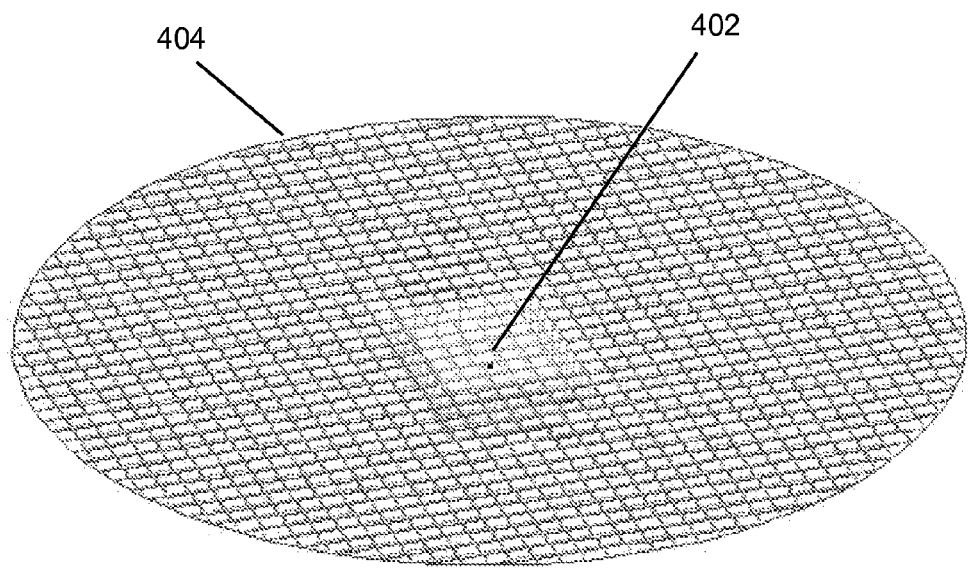
FIGS. 4A-4C collectively show an exemplary simulation result of an airbag deployment during a car crash in accordance with one embodiment of the present invention.
Figure 4B:
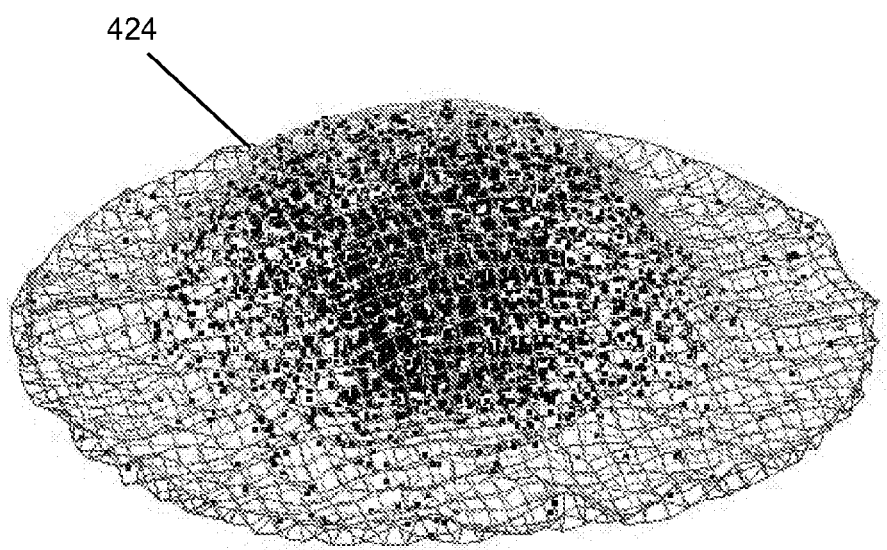
Figure 4C:
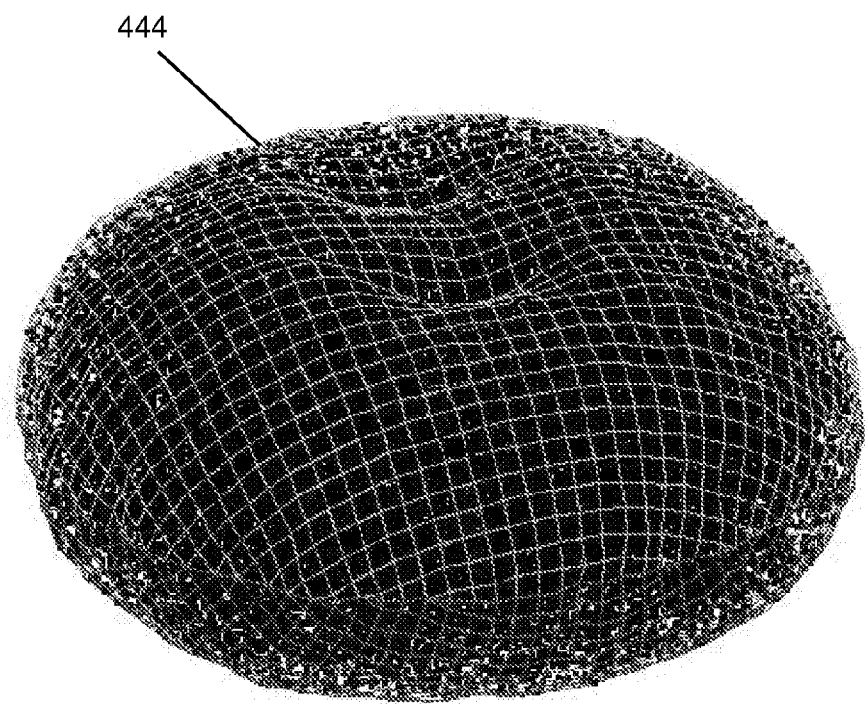

FIG. 3B shows an exemplary particle colliding with a flexible boundary 320 and with another exemplary particle in accordance with one embodiment of the present invention. The boundary 320 represents a flexible boundary of an enclosed volume. The boundary 320 may be made of plastics, fabrics, leathers, and the likes. In one embodiment, the initial geometry and material of the flexible boundary is defined in a finite element analysis model. The geometry of the boundary is represented by a plurality of the shell elements. The material of the boundary is represented by the nodal mass and the section properties of the shell elements. An exemplary finite element analysis model is shown in FIGS. 4A-4C. A plurality of new gas particles 342 is created in the enclosed volume at each solution cycle. The new gas particles travel through a nozzle 340 in random directions. Each of the new particles possesses a pre-determined mass m and a calculated average velocity v based on the temperature. The initial momentum and the translational kinetic energy of each of the particles are then computed with the mass and the average velocity as follows:

Momentum $I = m\,v$

Translational Energy $E_{TR} = \frac{1}{2}\,m\,v^2$

The total energy of a particle $E_{TOT}$ has two components: translation $E_{TR}$ and spinning-plus-vibration $E_{SV}$.

$$E_{TOT} = E_{TR} + E_{SV}$$

The initial balanced ratio $\alpha_0 = E_{SV}/E_{TR}$ is fixed for a particular type of gases (e.g., ⅔ for air, 0 for helium). All of new and existing particles may collide with each other and with the boundary at each solution cycle. At each collision, an energy transfer will happen between the particle and the boundary or between the particles. The energy transfer is based the principles of mass, momentum and energy conservation as follows:

$$m_{a0} + m_{b0} = m_{a1} + m_{b1}$$

$$I_{a0} + I_{b0} = I_{a1} + I_{b1}$$

$$E_{TOT\,a0} + E_{TOT\,b0} = E_{TOT\,a1} + E_{TOT\,b1}$$

where the subscripts a and b represent two objects (i.e., particle and boundary, or particle and particle), and the subscripts 0 and 1 represent the state before and after the collision, respectively. In addition, the energy transfer also follows a set of rules as follows: 1) only the translation component is transferred in a particle-to-boundary collision; and 2) the initial balance ratio is restored only after a particle-to-particle collision.

Use the gas particles 322 as an example, the particle 322 is created in the enclosed volume and travels towards the boundary 320. The particle energy $E_{TOT}$ has two components: translation $E_{TR}$ and spinning-plus-vibration $E_{SV}$. Just before the particle 322 collides with the boundary 320, the particle 322 is in position 324 having $E_{SV}$ and $E_{TR}$ with ratio $\alpha_0$. Similar, the boundary 320 has a mass and velocity. The mass of the boundary 320 at the point of collision is represented by an effective mass. In one embodiment, the effective mass is computed using nodal masses of a shell element in a finite element analysis model. The local coordinates of the shell element at the point of collision are used in the shape function of the shell element to calculate the contribution from each of the nodal masses. Right after the collision at position 326, a portion of translation component $E_{TR}$ is transferred to the boundary 320. The gas particle 322 carries a smaller $E_{TR}$ with a ratio $C\alpha_1$, which is greater than $\alpha_0$ due to the reduction of $E_{TR}$. The particle 322 travels further and collides with another particle 332. The particles 322 and 332 exchange energies and the initial balanced ratio $\alpha_0$ is restored, while the velocity and the total translational energy are different after the collision. For illustration simplicity, only one particle 322 collides with the boundary 320 and with another particle 332 are shown in FIG. 3B. The present invention sets no limit as to the number of gas particles to be used in a simulation.

FIGS. 4A-4C collectively show exemplary simulation results of an airbag deployment during a car crash in accordance with one embodiment of the present invention. Airbag has been proved to save many vehicle occupants during a car crash. However, there are incidents that the deployment of the airbag may cause injury to the vehicle occupants. Therefore, a realistic simulation of the airbag deployment in a car crash is important to a better design. According to one embodiment, the present invention enables simulation of inflation of the airbag (i.e., an enclosed volume with flexible boundary) using gas particles. The airbag in its initial folded configuration 404 is shown in FIG. 4A. The nozzle 402 is located in the center of the airbag. FIG. 4B shows the airbag configuration 424 at 5 ms after the initiation. It is evident that the airbag is partially inflated at this stage. Finally, FIG. 4C shows the fully inflated airbag configuration 444 at 30 ms after the initiation.

Figure 5:
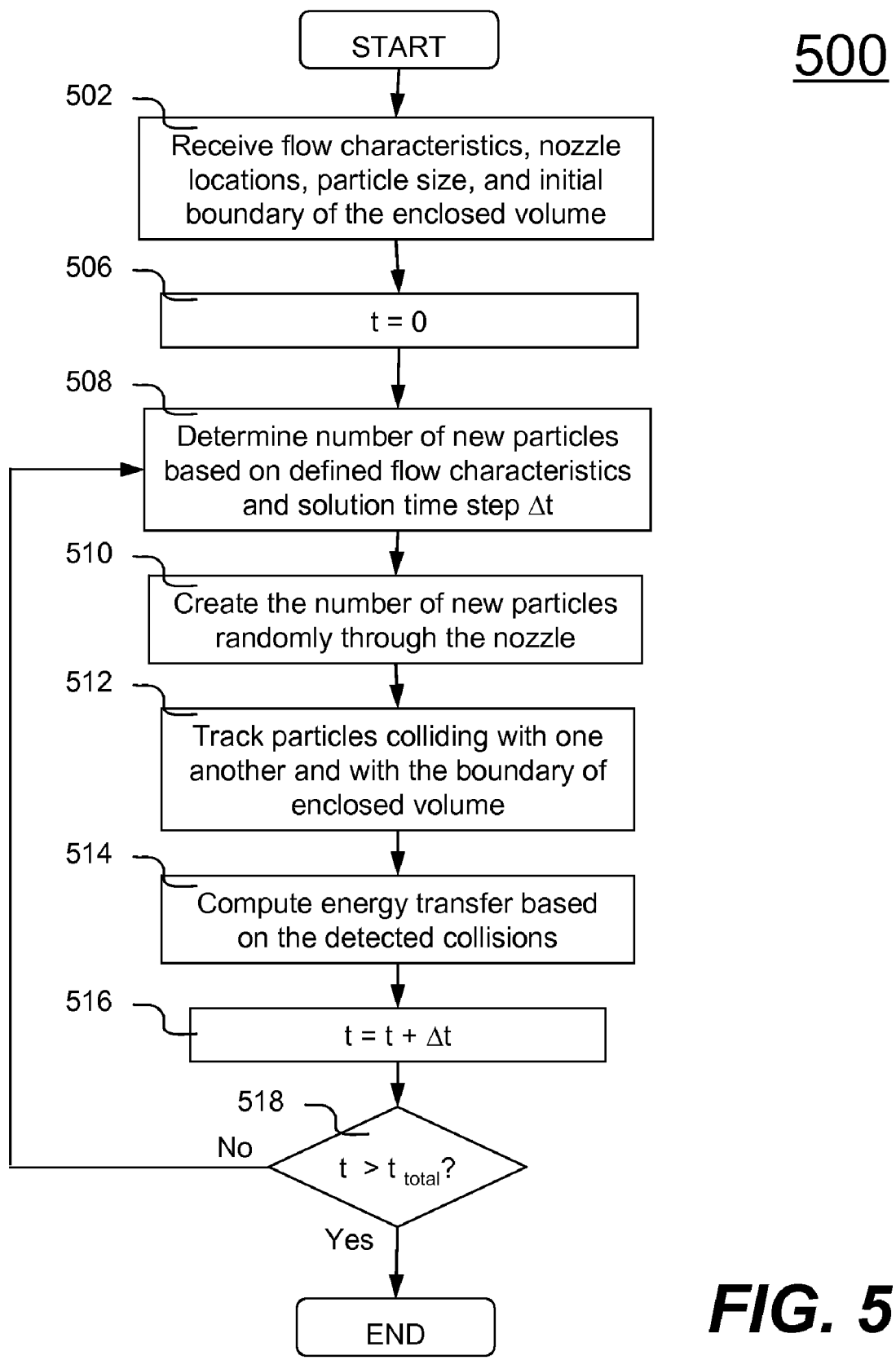
FIG. 5 shows a flowchart or process of simulating gas particles in an enclosed volume with a flexible boundary in accordance with one embodiment of the present invention.

FIG. 5 shows a flowchart 500 or process of simulating gas particles in an enclosed volume with a flexible boundary in accordance with one embodiment of the present invention. The process 500, which is preferably understood in conjunction with the previous figures, may be implemented in software. At 502, the process 500 starts by receiving gas flow characteristics such as the gas mass flow rate (e.g., chart 300 of FIG. 3A), temperature at the initiation of the gas flow, the location of at least one nozzle, the number of gas particles to be used in the simulation and the initial geometry and material of the flexible boundary. The size of gas particles and the average velocity at the initiation are calculated with the method described in the description of FIG. 3A. Then the process 500 initializes the current simulation or solution time to zero at 506. At 508, the process 500 uses the flow rate chart (e.g., chart 300) and the time step size Δt to determine how many new gas particles to be created. The new particles are created in the enclosed volume through nozzle or nozzles in random directions at 510. After the new particles are created in the enclosed volume, the process 500 tracks all of the new and existing particles within the enclosed volume for collisions at 512. There are two types of collisions: a) particle-to-boundary and 2) particle-to-particle. Once a collision is detected, the process 500 computes energy transfer between a particular particle and the boundary, or energy transfer between one particle and another particle at 514. The computation is performed based on the rules defined in the description of FIG. 3B. After finishing the energy transfer computations for all of the collisions detected, the process 500 updates the current solution time or simulation time at 516. In one embodiment, the current solution time is updated with an increment of the time step Δt. The process 500 moves to a test 518 to check whether the pre-defined total simulation has been reached. If the test 518 is false or the total simulation has not reached, the process 500 follows the "No" branch back to 508 repeating the steps for the new solution cycle until the test 518 becomes true and the process 500 ends.

Although an exemplary embodiment of invention has been disclosed, it will be apparent to those skilled in the art that various changes and modifications may be made to achieve the advantage of the invention. It will be obvious to those skilled in the art that some components may be substituted with another component providing the same function. The appended claims cover the present invention.

What is claimed is:

1. A computer-implemented method of simulating inflation of an enclosed volume having a flexible boundary with simulated gas particles in a finite element analysis for assisting users in design of the enclosed volume, the method comprising:

receiving, in a computer, a set of gas flow characteristics used for simulating the inflation of the enclosed volume and receiving a plurality of shell elements representing the flexible boundary;

calculating a set of simulated gas particle properties from the set of gas flow characteristics;

creating a number of new simulated gas particles based on the set of gas flow characteristics and the set of simulated gas particle properties, each of the new simulated gas particles is configured with a numerical kinetic energy having a translation component and a spinning-plus-vibration component, and said each of the new simulated gas particles is assigned an arbitrarily random direction towards the flexible boundary in the enclosed volume;

tracking all of the simulated gas particles for detecting one or more collisions between a first and a second objects;

calculating a simulated kinetic energy transfer between the first and second objects, when one of the first and second objects is one of the shell elements, the simulated kinetic energy transfer causes a portion of the inflation;

updating a current simulation time; and when the current simulation time has not reached a pre-defined total simulation time, repeating said creating, said tracking, said calculating the simulated kinetic energy transfer and said updating steps;

otherwise when the current solution time has reached the pre-defined total simulation time, displaying, in a monitor coupled to the computer, results of said simulating the inflation of the enclosed volume as desired.

2. The method of claim 1, wherein the set of flow characteristics include a gas mass flow rate curve, a temperature, and a total number of the gas particles to be used in the simulation.

3. The method of claim 1, wherein the first and second objects comprise a particular gas particle of the simulated gas particles and a respective one of the shell elements, respectively.

4. The method of claim 3, said calculating the simulated kinetic energy transfer further comprising:
   calculating an effective mass of the respective one of the shell elements;
   calculating a velocity change of the respective one of the shell elements and the particular gas particle; and
   adjusting the translation component of the numerical kinetic energy of the particular gas particle.

5. The method of claim 4, wherein the effective mass of the respective one of the shell elements is calculated with contribution of nodal masses in accordance with a shape function of the respective one of the shell elements.

6. The method of claim 1, further comprises calculating an initial balance ratio as a ratio between the spinning-plus-vibration component and the translation component when initially created.

7. The method of claim 6, wherein the first and second objects comprise a first gas particle and a second gas particle of the simulated gas particles.

8. The method of claim 7, said calculating the simulated kinetic energy transfer further comprising:
   calculating a velocity change of the first and the second gas particles; and
   restoring the initial balance ratio of the numerical kinetic energy of the first and the second gas particles.

9. The method of claim 1, wherein the enclosed volume is an airbag in a vehicle.

10. A computer program product including a computer recordable storage medium having computer readable code embodied in the medium for causing an application module to execute on a computer for simulating inflation of an enclosed volume having a flexible boundary with simulated gas particles in a finite element analysis for assisting users in design of the enclosed volume by a method comprising:

receiving, in a computer, a set of gas flow characteristics used for the inflation of the enclosed volume and receiving a plurality of shell elements representing the flexible boundary;

calculating a set of simulated gas particle properties from the set of gas flow characteristics;

creating a number of new simulated gas particles based on the gas flow characteristics and the set of simulated gas particle properties, each of the new simulated gas particles is configured with a numerical kinetic energy having a translation component and a spinning-plus-vibration component, and said each of the new simulated gas particles is assigned an arbitrarily random direction towards the flexible boundary in the enclosed volume;

tracking all of the simulated gas particles for detecting one or more collisions, each of the collisions is between a first object and a second object;

calculating a simulated kinetic energy transfer between the first and a second objects when one of the first and second objects is one of the shell elements, the simulated kinetic energy transfer causes a portion of the inflation;

determining whether said simulating the inflation of the enclosed volume has finished; and when said simulating has not reached a pre-defined total simulation time, repeating said creating, said tracking and said calculating the simulated kinetic energy transfer steps;

otherwise when said simulating has reached a pre-defined total simulation time, displaying, in a monitor coupled to the computer, results of said simulating the inflation of the enclosed volume as desired.

11. The computer program product of claim 10, wherein the first and second objects comprise a particular gas particle of the simulated gas particles and a respective one of the shell elements.

12. The computer program product of claim 11, wherein said calculating the simulated kinetic energy transfer further comprising:
   calculating an effective mass of the respective one of the shell elements;
   calculating a velocity change of the respective one of the shell elements and the particular gas particle; and
   adjusting the translation component of the numerical kinetic energy of the particular gas particle.

13. The computer program product of claim 10, wherein a ratio between the spinning-plus-vibration component and the translation component when initially created is defined as an initial balance ratio.

14. The computer program product of claim 13, wherein the first and second objects comprise a first gas particle and a second gas particle of the simulated gas particles.

15. The computer program product of claim 14, wherein said calculating the simulated kinetic energy transfer further comprising:
   calculating a velocity change of the first and the second gas particles; and restoring the initial balance ratio of the numerical kinetic energy of the first and the second gas particles.

16. A system for simulating inflation of an enclosed volume having a flexible boundary with simulated gas particles in a finite element analysis for assisting users in design of the enclosed volume, the system comprising:
   an I/O interface;
   a communication interface;
   a secondary memory;
   a main memory for storing computer readable code for an application module;

at least one processor coupled to the main memory, the secondary memory, the I/O interface, and the communication interface, said at least one processor executing the computer readable code in the main memory to cause the application module to perform operations of:

receiving a set of gas flow characteristics used for simulating the inflation of the enclosed volume and receiving a plurality of shell elements representing the flexible boundary;

calculating a set of simulated gas particle properties from the set of gas flow characteristics;

creating a number of new simulated gas particles based on the set of gas flow characteristics and the set of simulated gas particle properties, wherein each of the new gas particles is configured with a numerical kinetic energy having a translation component and a spinning-plus-vibration component;

tracking all of the simulated gas particles for detecting one or more collisions, each of the collisions is between a first and a second objects;

calculating a simulated kinetic energy transfer between the first and second objects, when one of the first and second objects is one of the shell elements, the simulated kinetic energy transfer causes a portion of the inflation;

updating a current simulation time; and when the current simulation time has not reached a pre-defined total simulation time repeating said creating, said tracking, said calculating the simulated kinetic energy transfer and said updating steps;

otherwise when the current solution time has reached the pre-defined total simulation time, displaying, in a monitor coupled to the system, results of said simulating the inflation of the enclosed volume as desired, such that the results can be viewed by users.

17. The system of claim 16, wherein the first and second comprise a particular gas particle of the simulated gas particles and a respective one of the shell elements.

18. The system of claim 17, said calculating the simulated kinetic energy transfer further comprising operations of:

calculating an effective mass of the respective one of the shell elements;

calculating a velocity change of the respective one of the shell elements and the particular gas particle; and adjusting the translation component of the numerical kinetic energy of the particular gas particle.

19. The system of claim 16, wherein a ratio between the spinning-plus-vibration component and the translation component when initially created is defined as an initial balance ratio.

20. The system of claim 19, wherein the first and second objects comprise a first gas particle and a second gas particle of the simulated gas particles.

21. The system of claim 20, said calculating the simulated kinetic energy transfer further comprising operations of: calculating a velocity change of the first and the second gas particles; and restoring the initial balance ratio of the numerical kinetic energy of the first and the second gas particles.

* * * * *